(12) United States Patent
Ching (10) Patent No.: US 12,314,924 B1
(45) Date of Patent: May 27, 2025

(54) RFID DISPENSER AND MEASURING SYSTEM FOR CONSUMER LIQUIDS

(71) Applicant: Ross Wing Yung Ching, Portland, OR (US)

(72) Inventor: Ross Wing Yung Ching, Portland, OR (US)

( * ) Notice: Subject to any disclaimer, the term of this patent is extended or adjusted under 35 U.S.C. 154(b) by 237 days.

(21) Appl. No.: 17/856,826

(22) Filed: Jul. 1, 2022

Related U.S. Application Data (60) Provisional application No. 63/217,626, filed on Jul. 1, 2021.

(51) Int. Cl.
*G06Q 20/20* (2012.01)
*G06K 7/10* (2006.01)

(52) U.S. Cl.
CPC ....... *G06Q 20/208* (2013.01); *G06K 7/10366* (2013.01); *G06Q 20/202* (2013.01)

(58) Field of Classification Search
CPC . G06Q 20/208; G06Q 20/202; G06K 7/10366
See application file for complete search history.

(56) References Cited

U.S. PATENT DOCUMENTS

| | | | |
|---|---|---|---|
| 7,411,505 B2 * | 8/2008 | Smith | G06K 19/06 340/572.1 |
| 2015/0375984 A1 * | 12/2015 | Arcand | G07F 13/065 141/94 |
| 2020/0029529 A1 * | 1/2020 | Bratu | A01K 11/006 |

* cited by examiner

*Primary Examiner* — A. Hunter Wilder
*Assistant Examiner* — Joseph M Mutschler
(74) *Attorney, Agent, or Firm* — Plager Schack LLP; Mark H. Plager, Esq.; Stephen Hallberg, Esq.

(57) ABSTRACT

A radio frequency identification (RFID) dispenser and measuring system for consumer liquids is disclosed. The RFID dispenser and measuring system for consumer liquids uses a RFID card to dispense the liquid and the RFID dispenser and measuring system for consumer liquids counts the volume being dispensed. The volume is then recorded on a server to be remembered when the customer checks out.

14 Claims, 9 Drawing Sheets

RFID DISPENSER AND MEASURING SYSTEM FOR CONSUMER LIQUIDS

This application claims benefit to U.S. Provisional Patent Application 63/217,626, entitled "RFID DISPENSER AND MEASURING SYSTEM FOR CONSUMER LIQUIDS," filed Jun. 29, 2021. The U.S. Provisional Patent Application 63/217,626 is incorporated herein by reference.

BACKGROUND

Embodiments of the invention described in this specification relate generally to liquid dispensers, and more particularly, to a radio frequency identification (RFID) dispenser and measuring system for consumer liquids.

In a normal zero waste shop, one has to weigh the empty container, fill it, then weigh the full container and subtract the two weights.

As such, customers need to touch liquid dispensers to manually pump and fill their containers. Then to measure quantity, customers would need to weigh their empty container, weigh their full container, and subtract the two.

This is time consuming, undesirable, and prone to human error.

Therefore, what is needed is a way to wirelessly dispense liquids and keep track of the volume being dispensed for check out purposes.

BRIEF DESCRIPTION

Some embodiments of the invention include a novel RFID dispenser and measuring system for consumer liquids and associated processes. In some embodiments, the RFID dispenser and measuring system for consumer liquids comprises an RFID card, an RFID reader, an Arduino Uno (or other comparable single board computer), a fluid pump, a liquid reservoir, a flow meter, a solenoid, and a checkout server computing device with a server operating system that is communicably connected to a point of sale (POS) system and also communicably connected to a database management system and corresponding database to store volume amounts of customers for check out. In some embodiments, the RFID dispenser and measuring system for consumer liquids uses the RFID card to dispense the liquid and the flow meter is able to measure the volume being dispensed, thereby allowing the volume to be recorded and saved for when the customer checks out.

In some embodiments, a process comprises a plurality of steps for using an RFID liquid dispenser and measuring system. In some embodiments, the process for using the RFID liquid dispenser and measuring system comprises (i) presenting, by a customer intending to purchase one or more liquid products, a supported RFID card at an RFID card reader of a particular product storage and dispensary unit among a plurality of product storage and dispensary units configured to dispense liquid products to customers using the RFID liquid dispenser and measuring system, (ii) activating, by a dispenser controller device of the particular product storage and dispensary unit, a fluid pump and solenoid of the particular product storage and dispensary unit, (iii) dispensing, while the supported RFID card is held at the RFID card reader, a particular liquid product associated with the particular product storage and dispensary unit, (iv) measuring and tracking, by a flow meter of the particular product storage and dispensary unit, volumetric liquid flow data for a flow of liquid for the particular liquid product being pulled, by the fluid pump, from a liquid reservoir of the particular product storage and dispensary unit and flowing out of a dispenser spout attached to an external surface of the particular product storage and dispensary unit into a liquid receptacle, (v) retrieving, by the dispenser controller device, the volumetric liquid flow data from the flow meter, (vi) storing, by the dispenser controller device, the volumetric liquid flow data, retrieved from the flow meter, in a memory unit communicably connected to the dispenser controller device, (vii) maintaining the stored volumetric liquid flow data in the memory unit until a checkout process is initiated and completed, even if the customer presents the supported RFID card at a different RFID card reader of a different product storage and dispensary unit among a plurality of product storage and dispensary units of the RFID liquid dispenser and measuring system, (viii) wirelessly transmitting, by the dispenser controller device through a WiFi transceiver, the volumetric liquid flow data and an identifier of the supported RFID card to a checkout interface device connected to a common network, (ix) receiving, at the checkout interface device, the volumetric liquid flow data and the supported RFID card identifier via the wireless transmission over the common network, (x) storing, by a checkout controller device of the checkout interface device, the volumetric liquid flow data and the supported RFID card identifier in a checkout memory unit communicably connected to the checkout controller device, (xi) scanning the supported RFID card at a checkout RFID reader of the checkout interface to start a checkout process, (xii) receiving, at the checkout RFID reader, an RFID card identifier, (xiii) providing the RFID card identifier to the checkout controller device, (xiv) searching, by the checkout controller device, the checkout memory unit for the supported RFID card identifier to match with the RFID card identifier, (xv) retrieving, by the checkout controller device, the volumetric liquid flow data from the checkout memory unit when the supported RFID card identifier matches the RFID card identifier, (xvi) identifying, by the checkout controller device reviewing the volumetric liquid flow data, checkout data comprising liquid product item number and quantity dispensed, (xvii), visually outputting, by the checkout controller device, the checkout data in a checkout touchscreen of the checkout interface, (xviii) creating, by a barcode and receipt printer, a barcode to use to scan at a point-of-sale (POS) system of choice or a receipt for the customer, and (xix) storing the checkout data in a persistent data storage.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having thus described the invention in general terms, reference is now made to the accompanying drawings,

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications. Also, all dimensions, volumes, amounts, and other such measurements specified in this disclosure are by way of example only and are not intended to be limiting. Furthermore, the proportions shown in the figures are not necessarily to scale. As will be understood by those of ordinary skill in the relevant art, the actual dimensions and proportions of any system, any device or part of a system or device disclosed in this specification will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment", "an embodiment", or "some embodiments" is intended to indicate that a particular feature, structure, or characteristic described in connection with the embodiment or embodiments is included in at least one embodiment, and possibly multiple embodiments, of the invention. The appearances of the phrases "in one embodiment", "an embodiment", or "some embodiments" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises", and "comprised" are not intended to exclude other additives, components, integers, or steps.

Also, it is noted that the embodiments may be described as a process that is depicted as a flowchart, a flow diagram, a structure diagram, or a block diagram. The flowcharts and block diagrams in the figures can illustrate the architecture, functionality, and operation of possible implementations of systems, methods and computer programs according to various embodiments disclosed. In this regard, each block in the flowchart or block diagrams can represent a module, segment, or portion of code, that can comprise one or more executable instructions for implementing the specified logical function(s). It should also be noted that, in some alternative implementations, the functions noted in the blocks may occur out of the order noted in the figures. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function. Additionally, each block of the block diagrams and/or flowchart illustration, and combinations of blocks in the block diagrams and/or flowchart illustration, can be implemented by special purpose hardware-based systems that perform the specified functions, or combinations of special purpose hardware and computer instructions.

Some embodiments provide a RFID dispenser and measuring system for consumer liquids. In some embodiments, the RFID dispenser and measuring system for consumer liquids comprises an RFID card, an RFID reader, an Arduino Uno (or other single board computer), a fluid pump, a liquid reservoir, a flow meter, a solenoid, and a checkout server computing device with a server operating system that is communicably connected to a point of sale (POS) system and also communicably connected to a database management system and corresponding database to store volume amounts of customers for check out. In some embodiments, the RFID dispenser and measuring system for consumer liquids uses the RFID card to dispense the liquid and the flow meter is able to measure the volume being dispensed, thereby allowing the volume to be recorded and saved for when the customer checks out.

In some embodiments, the process for using the RFID liquid dispenser and measuring system comprises (i) presenting, by a customer intending to purchase one or more liquid products, a supported RFID card at an RFID card reader of a particular product storage and dispensary unit among a plurality of product storage and dispensary units configured to dispense liquid products to customers using the RFID liquid dispenser and measuring system, (ii) activating, by a dispenser controller device of the particular product storage and dispensary unit, a fluid pump and solenoid of the particular product storage and dispensary unit, (iii) dispensing, while the supported RFID card is held at the RFID card reader, a particular liquid product associated with the particular product storage and dispensary unit, (iv) measuring and tracking, by a flow meter of the particular product storage and dispensary unit, volumetric liquid flow data for a flow of liquid for the particular liquid product being pulled, by the fluid pump, from a liquid reservoir of the particular product storage and dispensary unit and flowing out of a dispenser spout attached to an external surface of the particular product storage and dispensary unit into a liquid receptacle, (v) retrieving, by the dispenser controller device, the volumetric liquid flow data from the flow meter, (vi) storing, by the dispenser controller device, the volumetric liquid flow data, retrieved from the flow meter, in a memory unit communicably connected to the dispenser controller device, (vii) maintaining the stored volumetric liquid flow data in the memory unit until a checkout process is initiated and completed, even if the customer presents the supported RFID card at a different RFID card reader of a different product storage and dispensary unit among a plurality of product storage and dispensary units of the RFID liquid dispenser and measuring system, (viii) wirelessly transmitting, by the dispenser controller device through a WiFi transceiver, the volumetric liquid flow data and an identifier of the supported RFID card to a checkout interface device connected to a common network, (ix) receiving, at the checkout interface device, the volumetric liquid flow data and the supported RFID card identifier via the wireless transmission over the common network, (x) storing, by a checkout controller device of the checkout interface device, the volumetric liquid flow data and the supported RFID card identifier in a checkout memory unit communicably connected to the checkout controller device, (xi) scanning the supported RFID card at a checkout RFID reader of the checkout interface to start a checkout process, (xii) receiving, at the checkout RFID reader, an RFID card identifier, (xiii) providing the RFID card identifier to the checkout controller device, (xiv) searching, by the checkout controller device, the checkout memory unit for the supported RFID card identifier to match with the RFID card identifier, (xv) retrieving, by the checkout controller device, the volumetric liquid flow data from the checkout memory unit when the supported RFID card identifier matches the RFID card identifier, (xvi) identifying, by the checkout controller device reviewing the volumetric liquid flow data, checkout data comprising liquid product item number and quantity dispensed, (xvii), visually outputting, by the checkout controller device, the checkout data in a checkout touchscreen of the checkout interface, (xviii) creating, by a barcode and receipt printer, a barcode to use to scan at a point-of-sale (POS) system of choice or a receipt for the customer, and (xix) storing the checkout data in a persistent data storage.

As stated above, in a normal zero waste shop, one has to weigh the empty container, fill it, then weigh the full container and subtract the two weights. As such, customers need to touch liquid dispensers to manually pump and fill their containers. Then to measure quantity, customers would need to weigh their empty container, weigh their full container, and subtract the two. This is time consuming, undesirable, and prone to human error. Embodiments of the RFID dispenser and measuring system for consumer liquids described in this specification solve such problems by using RFID to make the dispenser touchless and adapts to the different viscosities for different liquids. At the same time, the RFID dispenser and measuring system for consumer liquids counts the volume being dispensed and stores it at the checkout counter. No need to weigh anything; making the checkout experience quick and easy.

Embodiments of the RFID dispenser and measuring system for consumer liquids described in this specification differ from and improve upon currently existing options. In particular, some embodiments differ by measuring liquids by volume, whereas everything else in the field is measured by weight. Specifically, the RFID dispenser and measuring system for consumer liquids uses an RFID card to dispense the liquid. The RFID dispenser and measuring system for consumer liquids also counts the volume being dispensed. The RFID dispenser and measuring system for consumer liquids records the volume and saves the volume data on a server to be remembered when the customer checks out.

The RFID dispenser and measuring system for consumer liquids of the present disclosure may be comprised of the following elements.
1. RFID card
2. RFID reader
3. Arduino Uno (or other comparable single board computer)
4. A fluid pump
5. A liquid reservoir
6. A flow meter
7. A solenoid
8. A checkout server computing device with a server operating system that is communicably connected to a POS system and connected to a database management system and corresponding database to store volume amounts of customers for check out.

The various elements of the RFID dispenser and measuring system for consumer liquids of the present disclosure may be related in the following exemplary fashion. It is not intended to limit the scope or nature of the relationships between the various elements and the following examples are presented as illustrative examples only. A customer places the RFID card (1) near the RFID reader (2). This results in a signal being sent to the Arduino Uno (3) to activate the fluid pump (4) and the solenoid (7), and to start counting pulses from the flow meter (6). The fluid pump (4) pulls liquid from the liquid reservoir (5). Once the customer pulls the RFID card (1) away from the RFID reader (2), the process stops and the volume measurement of dispensed liquid is upload to the checkout server (8).

The RFID dispenser and measuring system for consumer liquids of the present disclosure generally works by the RFID card, which is the size of a credit card and has a tiny chip inside, and the RFID reader, which continuously "looks" to see if the chip from the RFID card is nearby. An Arduino Uno, or other single board computer, is the brain of the RFID dispenser and measuring system and directs certain components to turn on when needed. Once the Arduino gets a signal that the RFID card is nearby, it sends a signal to turn on the fluid pump and solenoid. The fluid pump causes a suction and pulls liquid from the liquid reservoir. After the liquid runs through the pump it reaches a hall-effect flow meter that pulses a given amount of times per volume of fluid that has moved through it. The Arduino counts those pulses and converts that into fluid ounces. The fluid passes though the solenoid that the Arduino has opened up and is dispensed out to the customer. The Arduino then contacts the checkout server to record the fluid amount dispensed. Thus, the whole process starts with reading the RFID card.

To make the RFID dispenser and measuring system for consumer liquids of the present disclosure, a person may assemble the components as described above and write software code to tell the Arduino what to do with the components and when to perform each of the various operations. Lastly, the person can setup a server computer as a checkout server with a database to accept the dispensed liquid volume data from the Arduino.

Figure 1:
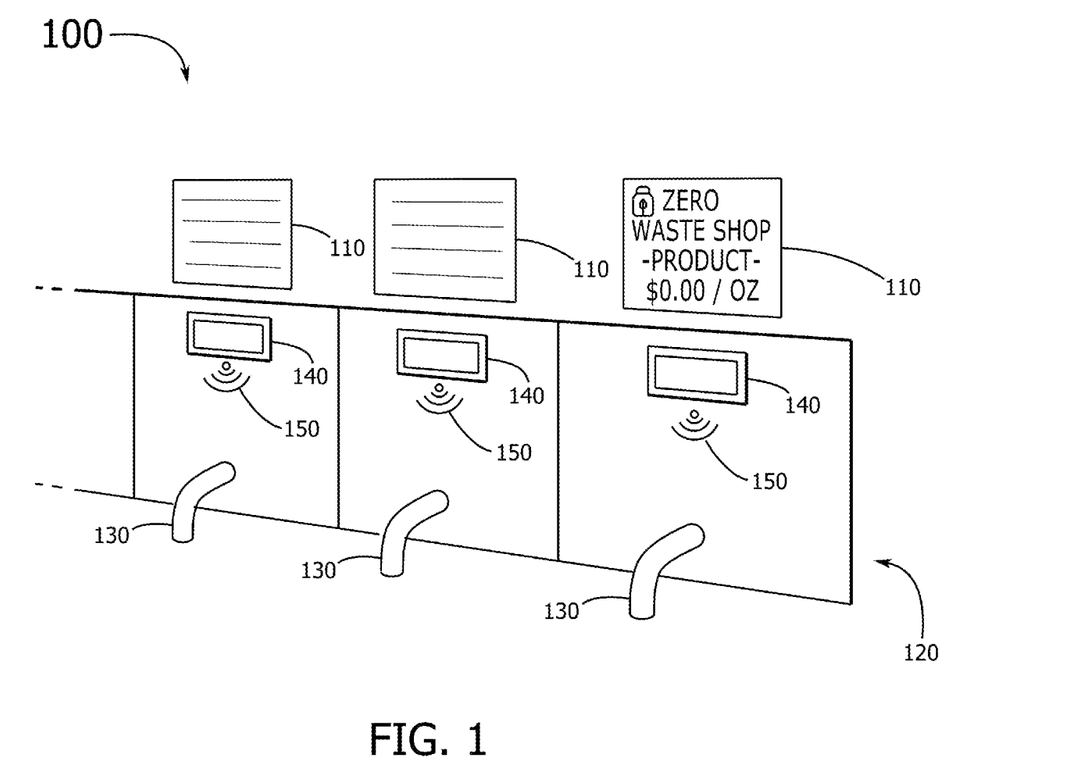
FIG. 1 conceptually illustrates a perspective view of an array of RFID liquid dispensers integrated into a RFID liquid dispenser and measuring system in some embodiments.

By way of example, FIG. 1 conceptually illustrates a perspective view of an array of RFID liquid dispensers integrated into a RFID liquid dispenser and measuring system 100. As shown in this figure, the RFID liquid dispenser and measuring system 100 includes a plurality of product description displays 110, a plurality of product storage and dispensary units 120 organized into an array of product storage and dispensary units, a plurality of dispenser spouts 130 for the plurality of product storage and dispensary units 120, a plurality of liquid crystal display (LCD) display panels 140 for the plurality of product storage and dispensary units 120, and a plurality of dispenser RFID readers 150 for the plurality of product storage and dispensary units 120. In some embodiments, the RFID liquid dispenser and measuring system 100 includes a contiguous arrangement of the product storage and dispensary units 120. In this way, the plurality of product storage and dispensary units 120 can be deployed in an array.

The plurality of product description displays 110 of some embodiments include descriptive displays of the liquid products that may be dispensed from the product storage and dispensary units 120. The product description displays 110 include any type of display including, without limitation, digital electronic displays and non-electronic displays with printed or written information.

The plurality of product storage and dispensary units 120 are configured to dispense liquid products when a user with a supported RFID card hold the RFID card near a product storage and dispensary unit 120. In this figure, the product storage and dispensary units 120 are organized into an array of contiguous product storage and dispensary units. However, the product storage and dispensary units 120 can be organized in other ways that are contiguous or not contiguous. While the product storage and dispensary units 120 in this figure are shown from a user's perspective (front-facing, exterior surface view), additional components of the product storage and dispensary units 120 are encapsulated behind the front-facing exterior surface shown in this figure. The additional components include wiring, electronic components, and other components related to the liquid products stored and dispensed by way of the RFID liquid dispenser and measuring system 100. Several of the encapsulated components are described below, by reference to FIG. 3.

In some embodiments, the plurality of dispenser spouts 130 are attached to (and/or protrude out of) the plurality of product storage and dispensary units 120. In some embodiments, the plurality of dispenser spouts 130 are configured to dispense liquid into product receptacles placed under each spout 130 when a supported RFID card is held nearby a dispenser RFID reader 150 of the product storage and dispensary unit 120. One or more liquid product storage containers are present in a backend part of the RFID liquid dispenser and measuring system 100 (not shown in this figure). In some embodiments, each dispenser spout 130 is configured to dispense a single liquid product from a corresponding liquid product storage container (also referred to as "product reservoir" or "fluid reservoir") that stores the liquid product. Liquid conduit and/or piping may connect each fluid reservoir to the corresponding dispenser spout 130 attached to the external surface to the product storage and dispensary unit 120. A fluid pump as activated by a trigger signal when the RFID card is nearby the dispenser RFID reader 150. When activated, the fluid pump pulls liquid from the liquid reservoir to flow to dispenser spout 130 for release into the product receptacle positioned beneath the spout 130.

In some embodiments, each LCD display panel 140 provides specific information about the single liquid product dispensed from the corresponding product storage and dispensary unit 120. Specifically, the plurality of LCD display panels 140 are configured to visually output at least one of a liquid product name and a liquid product item number and a price per fluid ounce for the single liquid product. In some embodiments, the plurality of LCD display panels 140 are further configured to visually output a number of fluid ounces dispensed for any given dispensing session activated by a supported RFID card. In some embodiments, the number of fluid ounces dispensed is visually output after dispensing of the single liquid product is completed, which occurs when the RFID card is removed away from the RFID reader 150. In some embodiments, the number of fluid ounces dispensed is visually output in realtime as a continually updating number while the single liquid product is being dispensed. In some embodiments, the number of fluid ounces dispensed is measured by a flow meter.

To use the RFID liquid dispenser and measuring system 100, a person (or "user") simply holds their RFID card close enough to the reader while holding or positioning any product receptacle underneath the dispenser spout 130. The product receptacle may be a jar, a mug, a bucket, a liquid flask, a liquid bladder, or any other container suitable for containing and holding liquid products. When satisfied with the amount filled in the product receptacle, the user pulls the supported RFID card away from the dispenser RFID reader 150 of the product storage and dispensary unit 120. This is described in detail next, by reference to FIG. 2.

Figure 2:
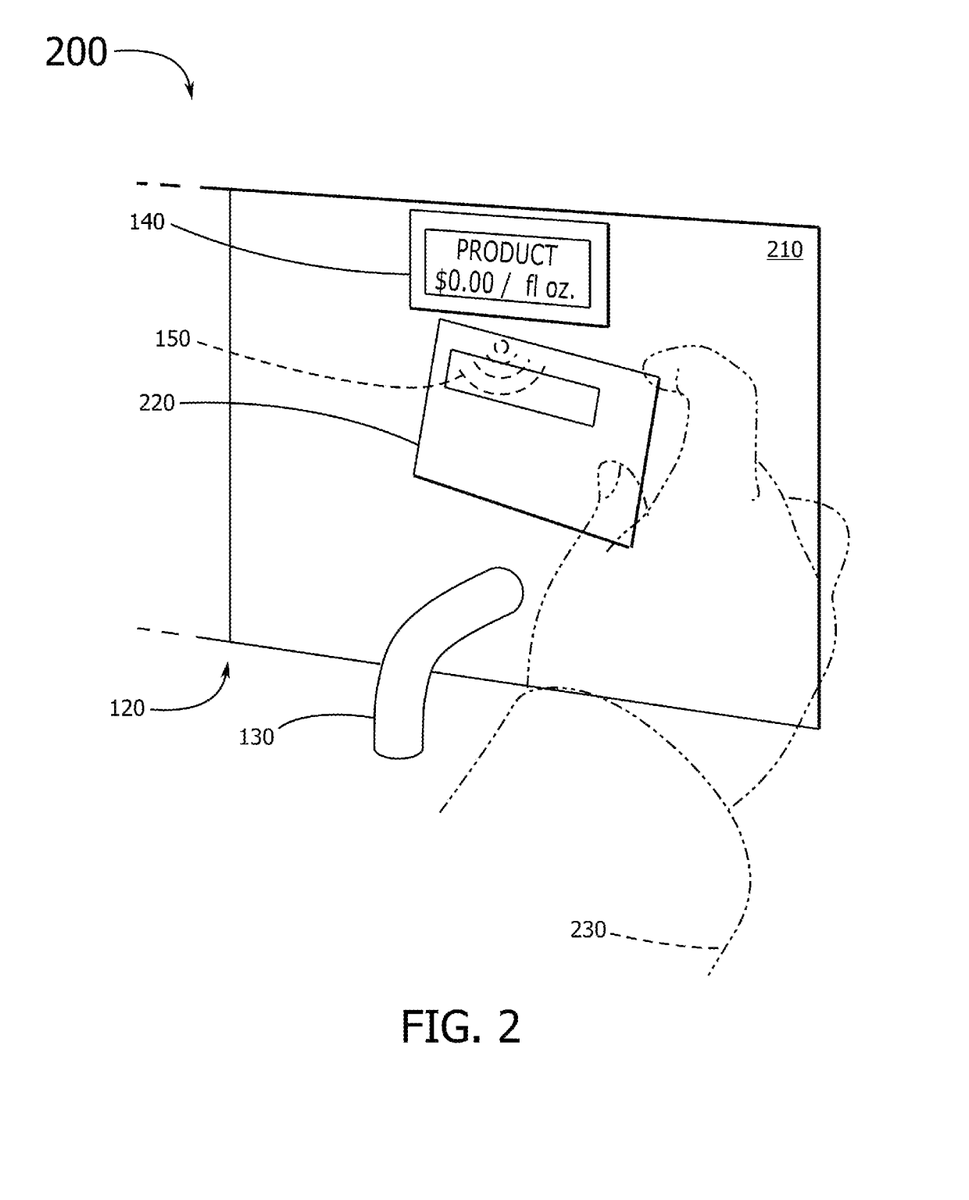
FIG. 2 conceptually illustrates RFID card activation of a single RFID liquid dispenser of the RFID liquid dispenser and measuring system in some embodiments.

Specifically, FIG. 2 conceptually illustrates RFID card activation 200 of a product storage and dispensary unit of the RFID liquid dispenser and measuring system. As shown in this figure, the RFID card activation 200 occurs for a specific product storage and dispensary unit 210 in the plurality of product storage and dispensary units 120. Like the product storage and dispensary units 120 described above, by reference to FIG. 1, the specific product storage and dispensary unit 210 is configured to dispense a single liquid product. However, any of the product storage and dispensary units 120, including the specific product storage and dispensary unit 210, can be alternately configured to dispense a plurality of liquid products constrained to a limit of one liquid product dispensed at any given moment. In this alternate configuration limiting dispensation of the liquid to only one liquid at any given moment, a liquid selection can be made by the user to select the particular liquid product to dispense at any given moment. An example of a product storage and dispensary unit configured to dispense a plurality of liquid products (one at a time) is described below, by reference to FIGS. 7 and 8.

In addition to the specific product storage and dispensary unit 210, this figure also demonstrates a supported RFID card 220 and an exemplary user 230 holding the RFID card 220 nearby the dispenser RFID reader 150 disposed along the exterior surface of the specific product storage and dispensary unit 210. Other components of the specific product storage and dispensary unit 210 are those noted above by reference to FIG. 1, namely, the dispenser spout 130 attached to and/or protruding out of the specific product storage and dispensary unit 210, the LCD display panel 140 configured to display information relevant to the single liquid product (e.g., name, item number, price per ounce, realtime updating of number of ounces dispensed, and/or total ounces dispensed when completed), and the RFID reader 150.

As the exemplary user 230 is holding the supported RFID card 220 in front of the RFID reader 150, the specific product storage and dispensary unit 210 triggers release of the single liquid product (which is caused by activation of the fluid pump, not shown in this figure). As long as the exemplary user 230 holds the supported RFID card 220 nearby the RFID reader 150, the specific product storage and dispensary unit 210 will continue the active flow of liquid out through the dispenser spout 130, so long as there is some volume of liquid remaining in the liquid reservoir (not shown in this figure). On the other hand, when the exemplary user 230 moves the supported RFID card 220 away from the dispenser RFID reader 150, the specific product storage and dispensary unit 210 stops the fluid pump from pulling more liquid from the liquid reservoir, thereby ending the flow of liquid being dispensed out of the dispenser spout 130.

Figure 3:
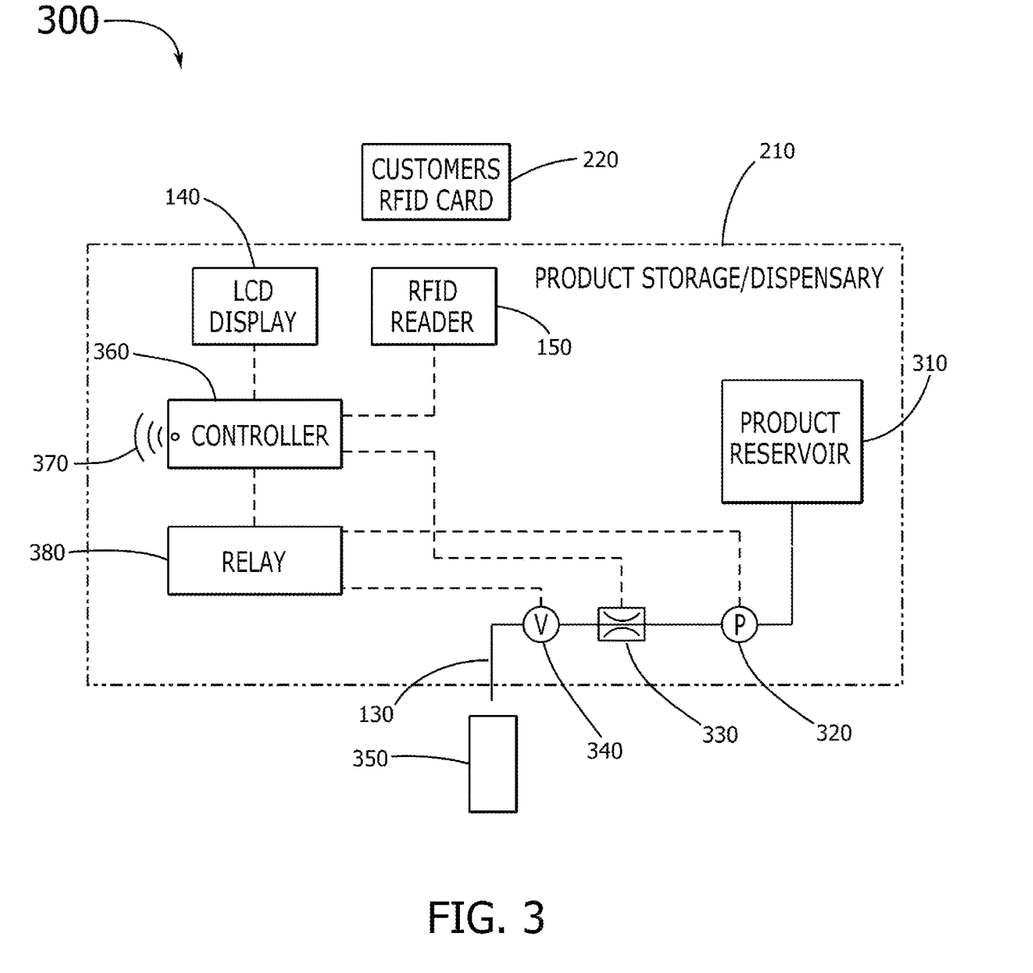
FIG. 3 conceptually illustrates a block diagram of a single RFID liquid dispenser in some embodiments of the RFID liquid dispenser and measuring system.

By way of example, FIG. 3 conceptually illustrates a block diagram of a product storage and dispensary unit configured to dispense a single liquid product 300. As shown in this figure, the product storage and dispensary unit configured to dispense a single liquid product 300 (hereinafter also referred to as the "single liquid product storage and dispensary unit 300") includes a product reservoir 310, a fluid pump 320, a flow meter 330, a solenoid activated dispenser valve 340, a dispenser controller device 360, a dispenser WiFi transceiver 370 and antenna that provides wireless network connectivity, a relay device 380, an LCD display 140, an RFID reader 150, and a dispenser spout 130. Also shown in this figure is a typical product receptacle 350 positioned to receive a flow of the single liquid product through the dispenser spout 130 when the supported RFID card 220 of a customer is used to activate the single liquid product storage and dispensary unit 300.

More specifically, the customer's RFID card 220 is held nearby or in front of the RFID reader 150. In some embodiments, a supported RFID card includes a RFID tag that includes a memory unit configured to store supported card authentication credentials. In some embodiments, the supported card authentication credentials comprise a card name and card password. The supported card authentication credentials ensure that only supported RFID cards can be used to dispense liquid from the single liquid product storage and dispensary unit 300 or any other product storage and dispensary unit 120 of the RFID liquid dispenser and measuring system. In particular, the RFID reader 150 sends out radio signals so that when the customer holds the RFID card 220 nearby or in front of the RFID reader 150, the RFID card 220 gets energized by the radio signals output from the RFID reader 150. When energized, the RFID 220 tag releases RFID tag data, including the supported card authentication credentials. The RFID reader 150 then captures the RFID tag data (including the supported card authentication credentials) and provides the RFID tag data to an RFID program running on the dispenser controller device 360. In some embodiments, the dispenser controller device is a computing device. In some embodiments, the dispenser controller device is a single board computer ("SBC" or "SBC dispenser controller device"). In some embodiments, the SBC dispenser controller device is an Arduino SBC.

For its part, the dispenser controller device 360 performs card authentication against the customer's RFID card 220, using the supported card authentication credentials in the RFID tag data to verify that the RFID card 220 is an authorized card supported for use with one or more product storage and dispensary unit(s) 120 of the RFID liquid dispenser and measuring system. Once authenticated as a valid (supported) RFID card 220, the dispenser controller device 360 transmits liquid dispensing control data to the relay device 380 which triggers the fluid pump 320 to pull liquid from the product reservoir 310. The dispenser controller device 360 also transmits liquid dispensing control data to the solenoid activated dispenser valve 340, which opens the valve. A flow meter 330 positioned between the fluid pump 320 and the solenoid activated dispenser valve 340 is able to measure the flow of liquid pumped by the fluid pump 320. The dispenser controller device 360 retrieves the liquid flow measurement data from the flow meter 330. In some embodiments, the dispenser controller device 360 displays the liquid flow measurement data on the LCD display 140 (in realtime or in total at completion). In some embodiments, the dispenser controller device 360 first converts the liquid flow measurement data to a number of liquid ounces dispensed before providing the number of liquid ounces dispensed for visual output on the LCD display 140 (in realtime or in total at completion). The dispenser controller device 360 also transmits the information (e.g., liquid name, price per ounce, number of ounces, etc.) to visually output onto the LCD display 140. In some embodiments, the dispenser controller device 360 is further configured to stop the flow of liquid when the number of ounces dispensed reaches a maximum ounce setting. In some embodiments, an administrator can set, change, or disable the maximum ounce setting. However, when the maximum ounce setting is active and is set to a number of ounces of the typical product receptacle 350, then the dispenser controller device 360 directs the relay device 380 to turn the fluid pump 320 off and close the valve of the solenoid activated dispenser valve 340.

Furthermore, the dispenser controller device 360 of some embodiments wirelessly transmits, to a checkout interface system via the dispenser WiFi transceiver 370 and antenna, checkout data comprising an identifier of the supported RFID card 220 and the number of liquid ounces dispensed by the customer's use of the supported RFID card 220. An example of a checkout interface is described below, by reference to FIGS. 4 and 5. In some embodiments, the identifier of the supported RFID card 220 comprises a unique card name. In some embodiments, the identifier of the supported RFID card 220 comprises a unique card number.

Figure 4:
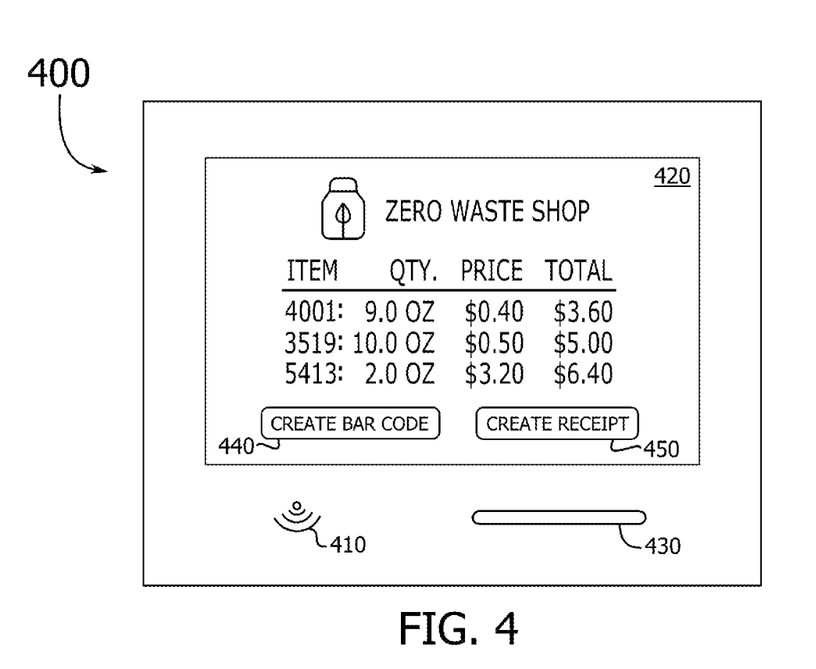
FIG. 4 conceptually illustrates a checkout interface of a RFID liquid dispenser and measuring system in some embodiments.

By way of example, FIG. 4 conceptually illustrates a checkout interface device (hereinafter also referred to as "checkout interface") of a RFID liquid dispenser and measuring system in some embodiments. Specifically, a checkout interface 400 shown in this figure includes a checkout RFID reader 410, a checkout touchscreen 420, and a barcode and receipt printer 430. The checkout interface 400 works in a similar manner as when dispensing liquid by a user. A checkout user holds the RFID card 220 near or in front of the checkout RFID reader 410 to start a checkout process. The checkout user may by the same user as the person who dispensed the liquid or may be another user, such as a cashier in a store or other authorized personnel of the store. By holding the RFID card 220 in front of the checkout RFID reader 410, the data stored on the RFID card 220 memory/tag is energized and released wirelessly for the RFID reader 410 to capture. The data captured by the RFID reader 410 includes the identifier of RFID card as well as the supported card authentication credentials, to verify authenticity of the card when required. With the identifier of RFID card captured by the RFID reader 410, the checkout data transmitted to the checkout interface 400 can be identified by comparing and matching to RFID card identifier data included in the checkout data. Thus, once the checkout process is started, the identifier of RFID card is used to find the checkout data corresponding to the RFID card 220 and, once found, is retrieved from storage (e.g., from a memory unit of the checkout interface device) by the checkout interface 400.

Specifically, the checkout data is retrieved from storage by identifying checkout data with an RFID card identifier that matches the identifier of the RFID card 220 just captured by the RFID reader 410. An example of a storage, such as a memory unit, and other components of a checkout interface are described below, by reference to FIG. 5.

After retrieving the checkout data corresponding to the identifier of the RFID card 200, the checkout interface 400 formats and visually outputs the checkout data in the checkout touchscreen 420. An example of the formatted checkout data is shown in this figure, showing line item totals for different liquid products (by item number), quantity of each liquid product dispensed, the price per ounce for the itemized liquid product, and the total amount due for each liquid product item. In this example, the total amount due is calculated as the product of quantity times price per ounce. While the barcode and receipt printer 430 may not be present in all versions of the checkout interface 400, when it is present it can be used to print of physical paper copy of a barcode for use in a point-of-sale (POS) system or to print out a physical paper receipt for the entire transaction. Instead of, or in conjunction with, printed a physical paper barcode and/or a physical paper receipt, the checkout interface 400 can be configured to visually output a bar code in the checkout touchscreen 420, digitally transmit the bar code directly to the POS, and/or digitally transmit an electronic copy of the receipt to the purchasing user. In some embodiments, the checkout interface 400 presents a create bar code button 440 and a create receipt button 450 near the formatted checkout data in the checkout touchscreen 420. When a user selects the create bar code button 440, a digital bar code is generated for each line item and visually output onto the checkout touchscreen 420. However, in some embodiments, the digital bar code for each line item is automatically created and visually output on the checkout touchscreen 420 along with the formatted checkout data. Similarly, when the user selects the create receipt button 450, a digital receipt is generated with the formatted checkout data. After generating the digital receipt, a delivery option is presented on the checkout touchscreen 420, allowing a selection of electronic delivery to the customer (e.g., via email, via SMS text message link, etc.).

Note that the barcode and receipt printer 430 described above is an optional feature. In another embodiment, a checkout interface device includes both the checkout RFID reader and the checkout touchscreen, but does not have a barcode and receipt printer is deployed for use. In that case, the bar code for each line item is automatically created and visually output onto the checkout touchscreen 420 along with the formatted checkout data.

Figure 5:
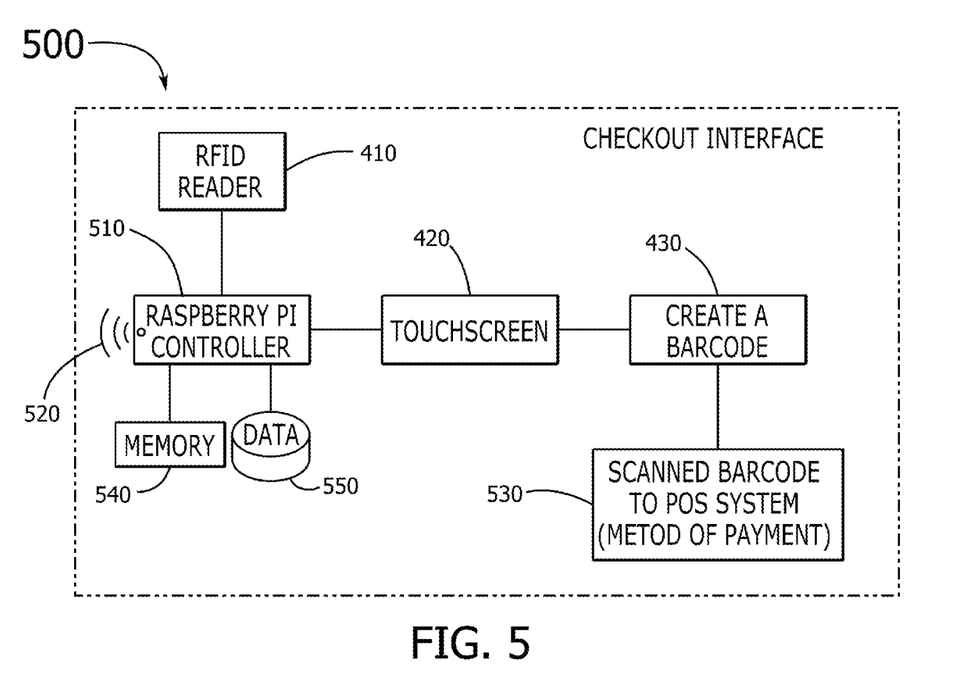
FIG. 5 conceptually illustrates a block diagram of a checkout interface of the RFID liquid dispenser and measuring system in some embodiments.

Now referring to another example, FIG. 5 conceptually illustrates a block diagram of a checkout interface 500 of the RFID liquid dispenser and measuring system in some embodiments. As shown, the block diagram of the checkout interface 500 includes the checkout RFID reader 410, the checkout touchscreen 420, the barcode and receipt printer 430, a checkout Raspberry Pi single board computer controller 510, a checkout WiFi transceiver 520 and antenna that provides wireless network connectivity, a scanned barcode to POS system method of payment 530, a memory unit 540, and a persistent data storage 550.

As noted above, the checkout RFID reader 410 captures the data stored on the RFID card (when held in front of the checkout RFID reader 410) and provides the data to the checkout Raspberry Pi single board computer controller 510 for processing and to look for any checkout data in the memory unit 540 with matching RFID card identifier. When matching checkout data is found, the checkout Raspberry Pi single board computer controller 510 retrieves and formats the matching checkout data to visually output in the checkout touchscreen 420, with further options for creating a barcode or printing a receipt via the barcode and receipt printer 430, and possible bridge to the POS by way of the scanned barcode to POS system method of payment 530. After payment is completed, the checkout Raspberry Pi single board computer controller 510 stores the checkout data and payment information in the persistent data storage 550. In some embodiments, all identifying information in the payment information and/or the checkout data is encrypted before storing in the persistent data storage 550.

Figure 6:
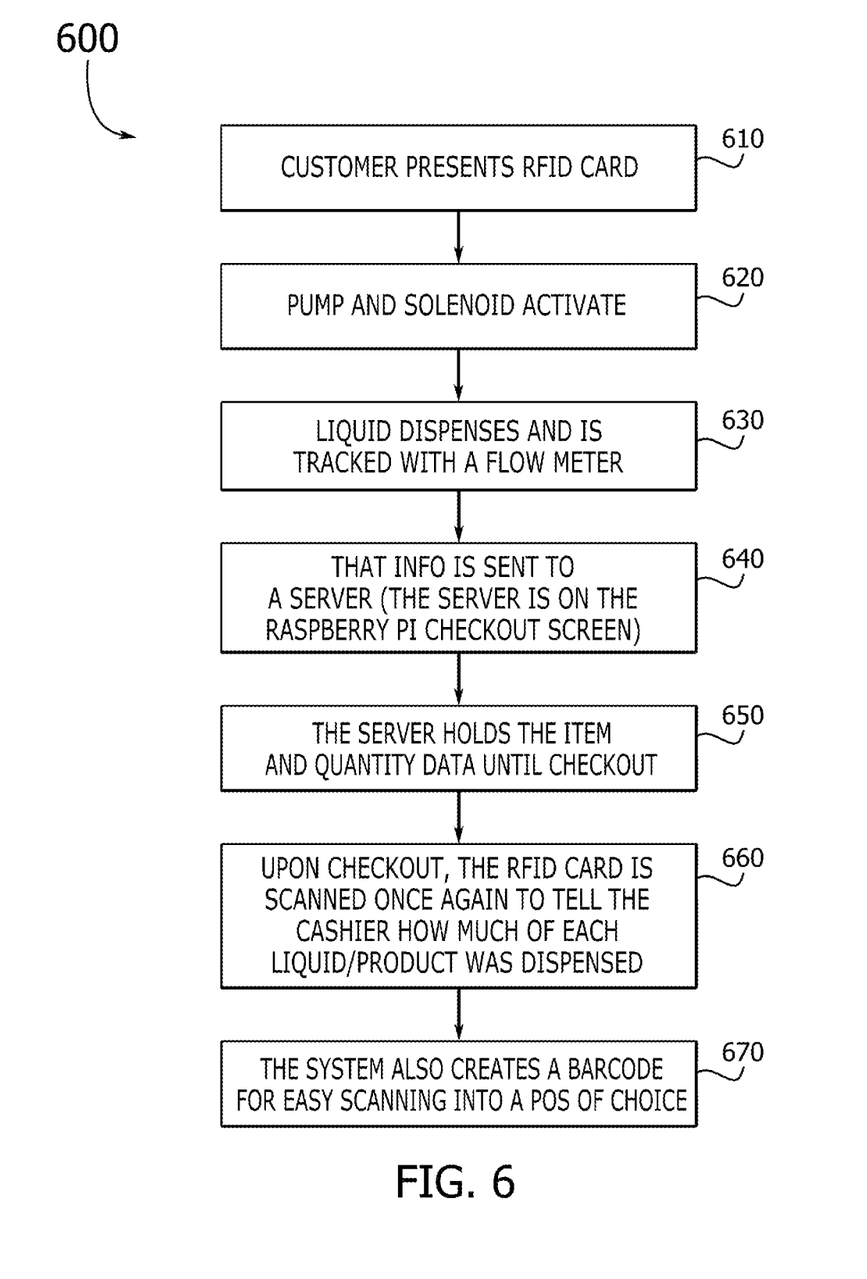
FIG. 6 conceptually illustrates a process for using the RFID liquid dispenser and measuring system in some embodiments.

By way of example, FIG. 6 conceptually illustrates a process 600 for using the RFID liquid dispenser and measuring system in some embodiments. As shown in this figure, the process 600 for using the RFID liquid dispenser and measuring system starts when a customer presents an RFID card (at 610). Specifically, the customer presents the RFID card by holding the RFID card nearby or in front of an RFID reader of a product storage and dispensary unit of the RFID liquid dispenser and measuring system.

In some embodiments, the process 600 for using the RFID liquid dispenser and measuring system proceeds to the next step during which the fluid pump and the solenoid of the product storage and dispensary unit are activated (at 620). As described above, the dispenser controller device of the product storage and dispensary unit instantly triggers activation of the fluid pump and the solenoid upon verified authentication of the presented RFID card. Similarly, if or when the RFID card is moved away from the RFID reader of the product storage and dispensary unit, then the dispenser controller device automatically causes the fluid pump and the solenoid to stop.

After activation of the fluid pump and the solenoid by the dispenser controller device of the product storage and dispensary unit, the process 600 for using the RFID liquid dispenser and measuring system of some embodiments proceeds forward to the next step for dispensing the liquid product (at 630), which is measured and tracked by the flow meter. In some embodiments, the process 600 performs a step at which a data stream with the measured and tracked liquid flow data is transmitted to the dispenser controller device (at 640) of the product storage and dispensary unit. This step for transmitting the data stream of the measured and tracked liquid flow data is a continual step that continues for as long as liquid is being dispensed and the flow of liquid is being measured by the flow meter.

In some embodiments, the dispenser controller device manages the flow data from the flow meter in the memory unit until the RFID card is moved away from the RFID reader, which stops the flow. Thus, the process 600 for using the RFID liquid dispenser and measuring system of some embodiments moves to the step at which the dispenser controller device holds the item and quantity data (at 650) in the memory unit until the checkout process is started.

In some embodiments, the process 600 for using the RFID liquid dispenser and measuring system continues forward to a step at which the checkout process is started by the RFID card being scanned by the checkout RFID reader of the checkout interface (at 660). By starting the checkout process via scanning the RFID card by the checkout RFID reader, the cashier (or other authorized personnel) is able to view the checkout data (found by matching the RFID card identifier to the same RFID card identifier stored in the memory unit with the checkout data) and engage the customer to complete the transaction. Also, the checkout data is formatted in a way that makes it easy for any viewer to see how much of each liquid product was dispensed. All of the data is also stored in the persistent storage unit, so it can be used for accounting review, etc.

In addition, checkout interface is able to create a POS barcode and/or a receipt. For the barcode, the process 600 for using the RFID liquid dispenser and measuring system performs the step for creating the POS barcode (at 670) for easy scanning in connection with the POS of choice. While this completes a transaction for a customer, the process 600 for using the RFID liquid dispenser and measuring system continues for each customer who presents an RFID card to an RFID reader of any one or more product storage and dispensary unit(s) of the RFID liquid dispenser and measuring system.

Figure 7:
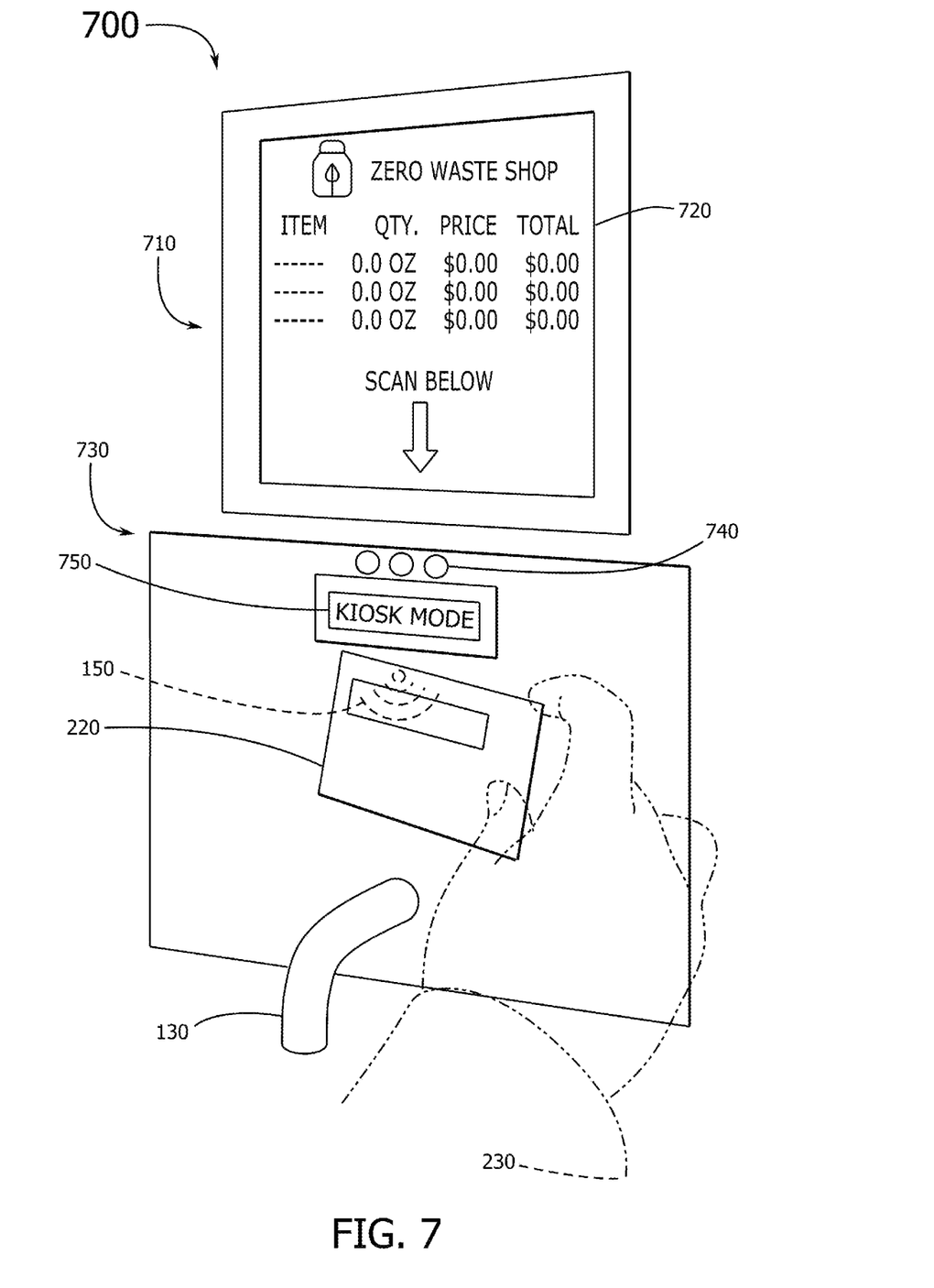
FIG. 7 conceptually illustrates a RFID selectable liquid product dispenser and a kiosk interface of a RFID selectable liquid product dispenser and measuring system in some embodiments.

Now, turning to examples of alternate embodiments, FIG. 7 conceptually illustrates a RFID selectable liquid product dispenser and a kiosk interface of a RFID selectable liquid product dispenser and measuring system 700 of at least one alternate embodiment. As shown in this figure, the RFID selectable liquid product dispenser and kiosk interface of the RFID selectable liquid product dispenser and measuring system 700 comprises a kiosk interface 710, a kiosk interface display 720, a kiosk product storage and dispensary unit 730, a plurality of kiosk mode selection buttons 740, a kiosk mode display panel 750, an RFID reader 150, and a dispenser spout 130. An exemplary user 230 holds up a supported RFID card 220 in front of the RFID reader 150 to effectuate activation of liquid dispensing.

In some embodiments, the plurality of kiosk mode selection buttons 740 comprises a first button associated with a first mode to display RFID card totals, a second button associated with a second mode for selecting a liquid product to dispense among a plurality of selectable liquid products, and a third button associated with a third mode for actively dispensing the selected liquid product (and when the third button is selected, selections of other buttons have no effect so long as liquid is being dispensed as the user holds the RFID card up to the RFID reader).

In some embodiments, the kiosk mode display panel 750 is configured to visually output, for the second mode, names of different liquid products while scrolling through the plurality of selectable liquid products by repeatedly selecting the second button and, for the third mode, a name of a selected liquid product and realtime volumetric data for the amount dispensed, measured in ounces. For the first mode, all visual output occurs in the kiosk interface 710.

Figure 8:
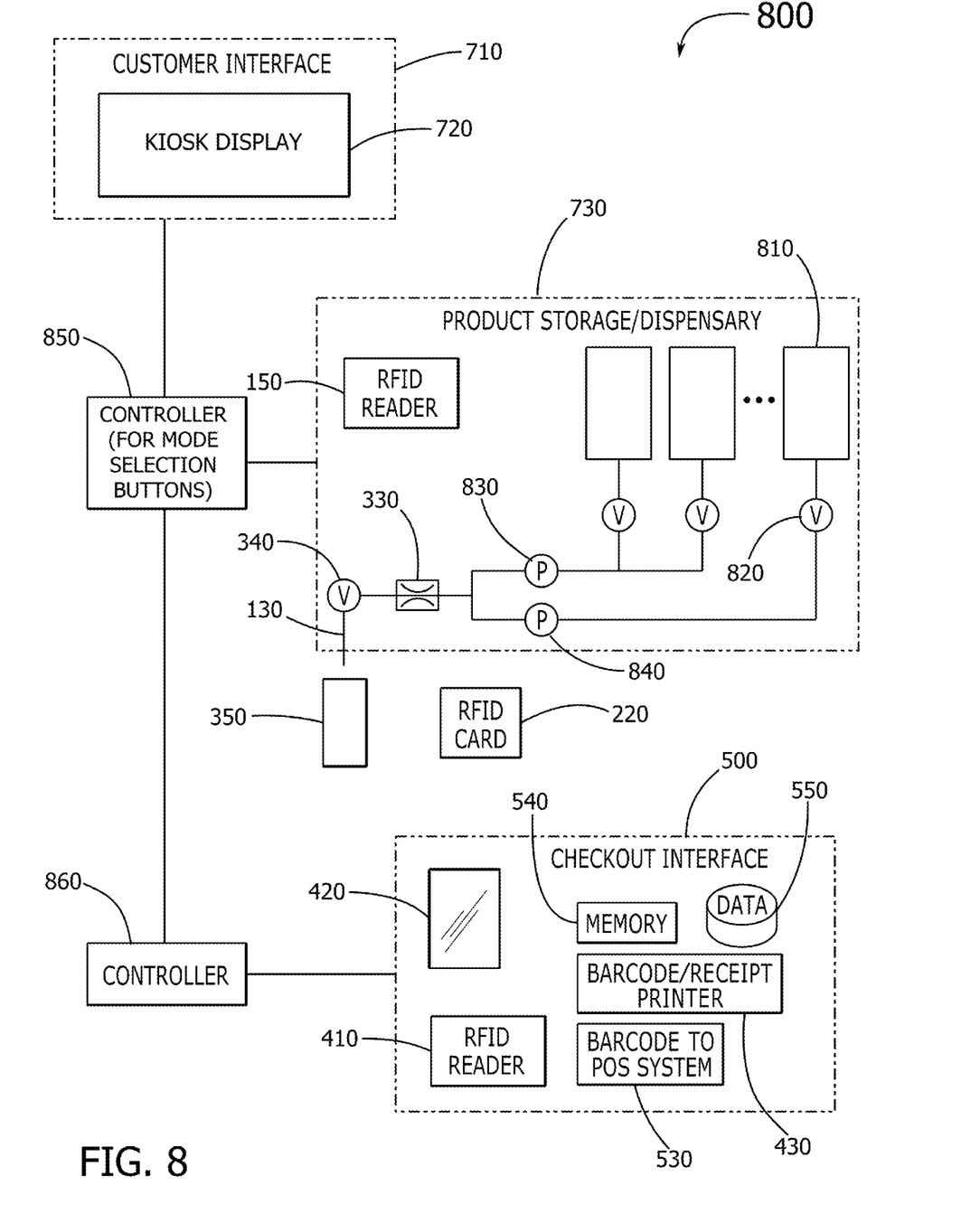
FIG. 8 conceptually illustrates a block diagram of the RFID selectable liquid product dispenser and measuring system in some embodiments.

Turning to another example, FIG. 8 conceptually illustrates a block diagram of the RFID selectable liquid product dispenser and measuring system 800 in some embodiments. As shown, the block diagram of the RFID selectable liquid product dispenser and measuring system 800 includes the kiosk interface 710 the kiosk interface display 720, the kiosk product storage and dispensary unit 730, the checkout interface 500, a dispenser controller device 850 adapted to process interactions for the kiosk mode selection buttons 740, and a checkout controller device 860.

As shown in this figure, the kiosk product storage and dispensary unit 730 includes a plurality of liquid product storage containers 810, a plurality of product valves 820 for the plurality of liquid product storage containers 810, a low viscosity pump 830, a high viscosity pump 840, the flow meter 330, the solenoid activated dispenser valve 340, the dispenser spout 130, and the RFID reader 150 which is configured to obtain data from the RFID card 220 when the RFID card 220 is presented in front or nearby the RFID reader 150. Furthermore, a typical liquid product receptacle 350 is positioned under the dispenser spout 130.

The checkout interface 500 includes the checkout RFID reader 410, the checkout interface 420, the barcode and receipt printer 430, the barcode bridge to POS system 530, the checkout memory 540, and the persistent data storage 550.

Of particular interest is the kiosk product storage and dispensary unit 730 which is configured to dispense different liquid products by user selection. Specifically, each of the plurality of liquid product storage containers 810 hold different liquid products. When a particular liquid product is selected by the user interacting with the plurality of kiosk mode selection buttons 740, a corresponding product valve 820 in the plurality of product valves 820 is opened and either the low viscosity pump 830 or the high viscosity pump 840 is activated by the dispenser controller device 850 to pull the liquid contained in the corresponding liquid product storage container 810. In this way, a customer can present the RFID card at the kiosk product storage and dispensary unit 730 to dispense a first liquid in a first receptacle, change to dispense a second liquid in a second receptacle, change to dispense a third liquid in a third receptacle (or add the third liquid to the first or second receptacle as a mixture), and so on. All liquid flow measurements are recorded by the dispenser controller device 850 and transmitted to the checkout interface 500 for processing and storage (in memory 540) by the checkout controller device 860. Furthermore, in some embodiments, the user may input a volume amount request via the keypad interface that is included as specific-form buttons included in the plurality of the kiosk mode selection buttons 740.

Figure 9:
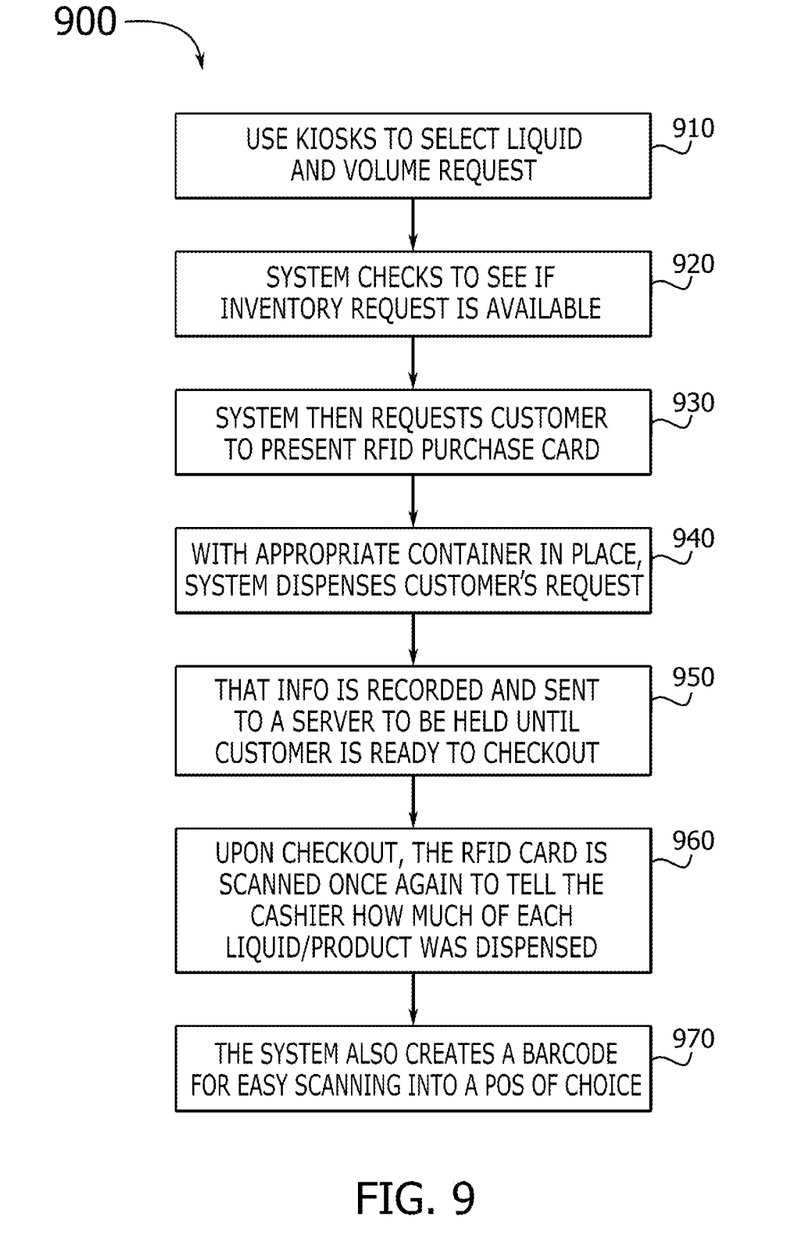
FIG. 9 conceptually illustrates a process for using the RFID selectable liquid product dispenser and measuring system in some embodiments.

Now turning to another flow chart process example, FIG. 9 conceptually illustrates a process for using the RFID selectable liquid product dispenser and measuring system 900 in some embodiments. As shown in this figure, the process for using the RFID selectable liquid product dispenser and measuring system 900 comprises a plurality of steps. The plurality of steps of the process for using the RFID selectable liquid product dispenser and measuring system 900 comprise (i) a first step (at 910) during which a customer uses kiosks to select liquids and make volume requests, (ii) a second step (at 920) during which the system checks to see if an inventory request is available, (iii) a third step (at 930) during which the system then requests the customer to present the supported RFID card, (iv) a fourth step (at 940) during which the system dispenses the customer's requested liquid and volume when the appropriate container is present under the dispenser spout, (v) a fifth step (at 950) during which the information is recorded and sent to the server to be held until the customer is ready to checkout, (vi) a sixth step (at 960) that occurs upon checkout, and whereby the supported RFID card is scanned once again to tell the cashier how much of each liquid product was dispensed, and (vii) a seventh step (at 970) during which the system also creates a barcode for easy scanning into a point-of-sale (POS) system of choice. While these examples described above, by reference to FIGS. 7-9, pertain to alternate embodiments, it is also understood that the RFID dispenser and measuring system of the present disclosure could be adapted for use as a system that dispenses other liquid products like drinks or that dispenses non-liquid substances, such as powdered substances, granular substances, etc.

Many of the above-described features and applications are implemented as software processes that are specified as a set of instructions recorded on a computer readable storage medium (also referred to as non-transitory computer readable medium, computer readable medium, or machine readable medium). When these instructions are executed by one or more processing unit(s) (e.g., one or more processors, cores of processors, or other processing units), they cause the processing unit(s) to perform the actions indicated in the instructions. The computer readable media does not include carrier waves and electronic signals passing wirelessly or over wired connections.

In this specification, the term "software" (and equivalent terms like "program" and "application") are meant to include firmware residing in read-only memory or applications stored in magnetic storage, which can be read into memory for processing by a processor, such as the processor of a single board computer ("SBC") like a Raspberry Pi or an Arduino Uno, or other SBC, but also may be a processor of another computing device, such as a mobile communication device (e.g., a smartphone), a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define specific machine implementations that execute and perform the operations of the software programs.

Figure 10:
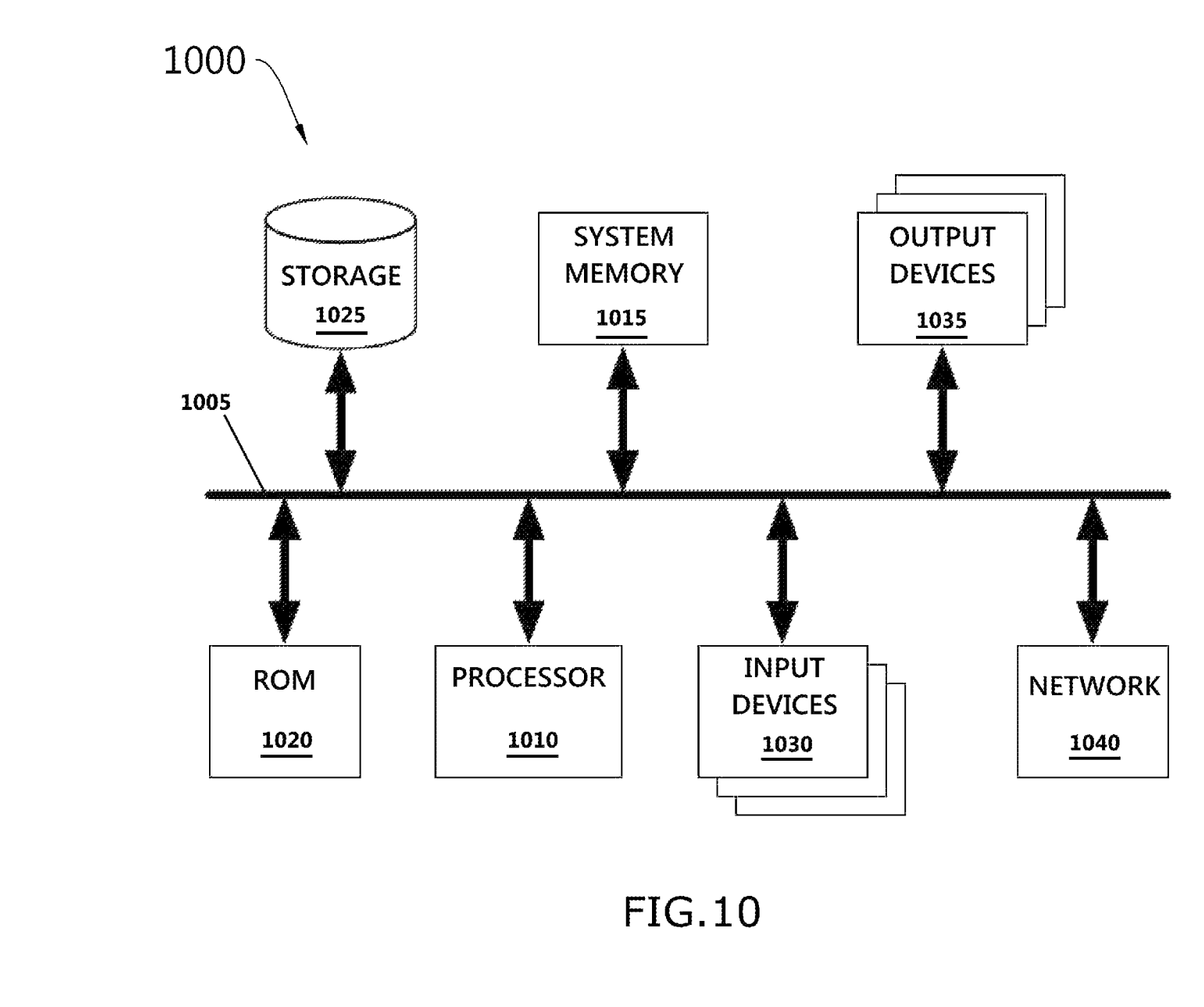
FIG. 10 conceptually illustrates an electronic system with which some embodiments of the invention are implemented.

FIG. 10 conceptually illustrates an electronic system 1000. The electronic system 1000 includes a bus 1005, processing unit(s) 1010, a system memory 1015, a read-only memory 1020, a permanent storage device 1025, input devices 1030, output devices 1035, and a network 1040.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1020, the system memory 1015, and the permanent storage device 1025.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1020 stores static data and instructions that are needed by the processing unit(s) 1010 and other modules of the electronic system. The permanent storage device 1025, on the other hand, is a read-and-write memory device. This device is a non-volatile memory unit that stores instructions and data even when the electronic system 1000 is off. Some embodiments use a mass-storage device (such as persistent data storage 550 of the checkout interface device) as the permanent storage device 1025.

Other embodiments use a removable storage device (such as a flash drive) as the permanent storage device 1025. Like the permanent storage device 1025, the system memory 1015 is a read-and-write memory device. However, unlike storage device 1025, the system memory 1015 is a volatile read-and-write memory, such as a random access memory. The system memory 1015 stores some of the instructions and data that the processor needs at runtime. In some embodiments, the invention's processes are stored in the system memory 1015, the permanent storage device 1025, and/or the read-only memory 1020. From these various memory units, the processing unit(s) 1010 retrieves instructions to execute and data to process in order to execute the processes of some embodiments.

The bus 1005 also connects to the input and output devices 1030 and 1035. The input devices enable the user to communicate information and select commands to the electronic system. The input devices 1030 include alphanumeric keyboards and pointing devices (also called "cursor control devices"). The output devices 1035 display images generated by the electronic system 1000. The output devices 1035 include printers (such as the barcode and receipt printer 430) and display devices, such as liquid crystal displays (LCD) and organic light emitting diode (OLED) displays. Some embodiments include devices such as a touchscreen that functions as both input and output devices.

Finally, as shown in FIG. 10, bus 1005 also couples electronic system 1000 to a network 1040 through a network adapter (not shown). In this manner, the computer can be a part of a network of computers (such as a local area network ("LAN"), a wide area network ("WAN"), or an intranet), or a network of networks (such as the Internet). Any or all components of electronic system 1000 may be used in conjunction with the invention.

These functions described above can be implemented in digital electronic circuitry, in computer software, firmware, or hardware. The techniques can be implemented using computer program products. Programmable processors and computers can be packaged or included in mobile devices. The processes may be performed by one or more programmable processors and by one or more set of programmable logic circuitry. General and special purpose computing and storage devices can be interconnected through communication networks.

While the invention has been described with reference to numerous specific details, one of ordinary skill in the art will recognize that the invention can be embodied in other specific forms without departing from the spirit of the invention. For instance, FIGS. 6 and 9 conceptually illustrate processes in which the specific operations of the process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. An RFID liquid dispenser and measuring process comprising:
   detecting, by a radio frequency identification (RFID) card reader of a particular product storage and dispensary unit configured to dispense a particular liquid product, a supported RFID card that is positioned nearby the RFID card reader;
   capturing, by the RFID card reader when the supported RFID card is positioned nearby the RFID card reader, data comprising an identifier ("identifier data") of the RFID card;
   providing, by the RFID card reader, the identifier data to a dispenser controller of the particular product storage and dispensary unit, wherein the dispenser controller is configured to verify the identifier data to determine whether the supported RFID card is authorized for use in dispensing the particular liquid product;

transmitting, by the dispenser controller when the identifier data is verified and the supported RFID card is authorized, liquid dispensing control data to (i) a fluid pump of the particular product storage and dispensary unit that is configured to pull the particular liquid from a product reservoir and (ii) a dispenser valve of the particular product storage and dispensary unit that is configured to open to release the particular liquid pulled from the product reservoir by the fluid pump;

dispensing, only while the supported RFID card is positioned nearby the RFID card reader and the supported RFID card is detected by the RFID card reader, the particular liquid through the dispenser valve while the fluid pump pulls the particular liquid from the product reservoir;

measuring and tracking, by a flow meter of the particular product storage and dispensary unit, volumetric liquid flow data for a flow of the particular liquid being dispensed;

retrieving, by the dispenser controller, the volumetric liquid flow data measured and tracked by the flow meter;

storing, by the dispenser controller, the volumetric liquid flow data in a memory unit of the particular product storage and dispensary unit; and wirelessly transmitting, by the dispenser controller through a WiFi transceiver of the particular product storage and dispensary unit, the volumetric liquid flow data and the identifier data of the supported RFID card to a checkout interface device connected to a common network.

2. The RFID liquid dispenser and measuring process of claim 1, wherein the dispenser valve is activated by a solenoid of the particular product storage and dispensary unit.

3. The RFID liquid dispenser and measuring process of claim 1, wherein the volumetric liquid flow data is measured by the flow meter continuously as the particular liquid is being dispensed through the dispenser valve and only while the supported RFID card is positioned nearby the RFID card reader.

4. The RFID liquid dispenser and measuring process of claim 3, wherein the volumetric liquid flow data is further measured by the flow meter based on the volume of the particular liquid flowing through the dispenser valve and out of a dispenser spout attached to an external surface of the particular product storage and dispensary unit.

5. The RFID liquid dispenser and measuring process of claim 1 further comprising maintaining the stored volumetric liquid flow data in the memory unit until a checkout process is initiated and completed.

6. The RFID liquid dispenser and measuring process of claim 5, wherein the dispenser controller comprises a single board computer (SBC) that is communicatively connected to the common network, wherein the memory unit is communicably connected to the SBC of the dispenser controller.

7. The RFID liquid dispenser and measuring process of claim 6 further comprising:

receiving, at the checkout interface device, the volumetric liquid flow data and the identifier data of the supported RFID card via the wireless transmission over the common network;

storing, by a checkout controller device of the checkout interface device, the volumetric liquid flow data and the identifier data of the supported RFID card in a checkout memory unit communicably connected to the checkout controller device;

initiating the checkout process when the supported RFID card is positioned nearby a checkout RFID reader of the checkout interface device;

receiving, by the checkout RFID reader of the checkout interface device, the identifier data of the supported RFID card;

providing the identifier data of the supported RFID card to the checkout controller device;

retrieving, by the checkout controller device, the volumetric liquid flow data from the checkout memory unit when the identifier data of the supported RFID card stored in the checkout memory unit matches the identifier data of the supported RFID card received by the checkout RFID reader of the checkout interface device; and visually outputting, by the checkout controller device, checkout data in a checkout touchscreen of the checkout interface, wherein the checkout data comprises a liquid product item number and quantity dispensed based on the volumetric liquid flow data.

8. The RFID liquid dispenser and measuring process of claim 7, wherein initiating the checkout process comprises scanning, by the checkout RFID reader of the checkout interface device, the supported RFID card while the supported RFID card is positioned nearby the checkout RFID reader.

9. The RFID liquid dispenser and measuring process of claim 7 further comprising creating, by a barcode and receipt printer, one or more of (i) a barcode to use to scan at a point-of-sale (POS) system of choice and (ii) a receipt for the customer.

10. The RFID liquid dispenser and measuring process of claim 1, wherein the data further comprises RFID tag data of the RFID card, wherein detecting the RFID card by the RFID card reader comprises detecting the RFID tag data of the RFID card.

11. The RFID liquid dispenser and measuring process of claim 10, wherein the RFID tag data comprises the identifier data.

12. The RFID liquid dispenser and measuring process of claim 11, wherein detecting the RFID tag data of the RFID card comprises outputting, by the RFID card reader, radio signals that energize the RFID card when the RFID card is positioned nearby the RFID card reader.

13. The RFID liquid dispenser and measuring process of claim 12 further comprising releasing, by the RFID card, the RFID tag data when energized by the radio signals, wherein the RFID tag data is continuously released by the RFID card until the RFID card is moved away from the RFID card reader and the RFID card is not energized by the radio signals.

14. The RFID liquid dispenser and measuring process of claim 13, wherein dispensing the particular liquid comprises continuously dispensing the particular liquid only while the RFID tag data is continually released by the energized RFID card and detected by the RFID card reader.

* * * * *